United States Patent [19]

Hoskinson et al.

[11] Patent Number: 5,339,351

[45] Date of Patent: Aug. 16, 1994

[54] EMERGENCY RESPONSE SYSTEM

[76] Inventors: John D. Hoskinson, 623 Glacier Ave. South, Pacific, Wash. 98047; Stephen W. Horton, 900 East Fulton, No. 2, Mt. Vernon, Wash. 98273

[21] Appl. No.: 892,446

[22] Filed: Jun. 2, 1992

[51] Int. Cl.$^5$ .......................................... H04M 11/04
[52] U.S. Cl. ........................................ 379/45; 379/37; 379/39; 379/49
[58] Field of Search .................... 379/45, 39, 37, 38, 379/49, 96, 127, 142, 201, 210, 211, 50

[56] References Cited

U.S. PATENT DOCUMENTS

| | | | |
|---|---|---|---|
| 4,803,719 | 2/1989 | Ulrich | 379/399 |
| 4,843,377 | 6/1989 | Fuller et al. | 379/38 |
| 4,893,325 | 1/1990 | Pankonen et al. | 379/45 |
| 4,924,491 | 5/1990 | Compton et al. | 379/37 |
| 4,935,951 | 6/1990 | Robinson et al. | 379/37 |
| 5,077,788 | 12/1991 | Cook et al. | 379/142 |
| 5,161,180 | 11/1992 | Chavous | 379/127 |

OTHER PUBLICATIONS

The article "E911 Public Safety Answering Point" Interface Between a 1/1AESS ™ Switch and Customer Premises Equipment, Issue 1, Nov. 1987 pp. 2–12.
Edgar S. Delong, Jr., "Making 911 Even Better," *Telephony*, Dec. 14, 1987, pp. 60–63.

*Primary Examiner*—Curtis Kuntz
*Assistant Examiner*—Jason Chan
*Attorney, Agent, or Firm*—Christensen, O'Connor, Johnson & Kindness

[57] ABSTRACT

A 911 emergency response system that includes a location identification module, preferably in solid state circuit form, associated with each residence or each extension of a PBX is disclosed. Preferably, the location identification modules are powered by telephone line voltage. A location identification module is enabled when its associated telephone goes off-hook and an emergency code, e.g., 911 is dialed. Thereafter, in response to an inquiry from the emergency response center that receives the emergency call, the location identification module sends the location of the associated telephone to the emergency response center operator where the location is displayed on a dispatcher's console.

70 Claims, 6 Drawing Sheets

EMERGENCY RESPONSE SYSTEM

TECHNICAL AREA

This invention relates to telephone networks and, more particularly, to an emergency response system that forms a portion of a telephone network.

BACKGROUND OF THE INVENTION

In recent years, emergency response systems have come into widespread use in the United States. If not already in existence, emergency response systems are likely to become widely used in other countries of the world. As a matter of fact, several Western European countries already have emergency response systems.

In an emergency response system, emergency calls are made by dialing a specific emergency code—911 in the United States and 999 in Western Europe. The calls are routed to an emergency response center, denoted a public safety answering point ("PSAP") in the U.S. In the U.S., basic 911 service merely provides routing of 911 service calls to the PSAP serving the subscribing community. Enhanced 911 service drastically improves basic 911 service. Enhanced 911 service provides automatic number identification ("ANI") and automatic location identification ("ALI"), in addition to selectively routing emergency response, i.e., 911, calls to PSAPs. With ANI, a 911 dispatcher receives a visual display of the telephone number associated with the telephone that originated the 911 call. With ALI, the dispatcher also receives a visual display of the name and address associated with the calling telephone number. Obviously, the extra information aids in promptly responding to the emergency.

Unfortunately, present enhanced 911 emergency response systems have two major disadvantages. One disadvantage is the cost of operating such a system. The cost is prohibitive for many small communities with the United States. The second disadvantage is the difficulty in identifying the exact location of the telephone that placed a 911 call in all circumstances.

Enhanced 911 emergency response system costs can be broken down into two categories. The first category is the cost of the equipment necessary to establish the system. Overall, this cost is relatively minimal. The major cost of an enhanced 911 emergency response system is the ongoing cost associated with obtaining and maintaining a database that includes current address information. At the present time, regional organizations provide location identification information to local communities that operate 911 enhanced emergency response systems. Obviously, a massive effort is required to maintain address information current. Address information is maintained in regional reverse directories operated by regional organizations owned by a large telephone company or a subsidiary of a large telephone company. When a 911 call is made, the regional reverse directories are either automatically accessed or manually accessed by a local community 911 dispatcher, via a long distance telephone line. Regardless of how accessed, the telephone number of the telephone that placed the 911 call causes the reverse directory to generate address information, which is displayed on the 911 dispatcher's console. Because regional reverse directories are expensive to maintain, the access charges to local communities providing enhanced 911 emergency response service are relatively high.

In addition to being expensive to maintain, regional reverse directories are not always as accurate as desired. More specifically, as noted above, at present, when a 911 call is placed, an enhanced 911 emergency response system automatically routes the call to a regional center, as well as to a 911 dispatcher. By means of a reverse directory, the regional center determines the address of the call and sends this information to the 911 dispatcher. The address provided by the reverse directory is usually the billing address of the associated telephone number, which may not be the same as the physical location of the telephone that placed the 911 call. While, in most residence situations, residence addresses correspond to billing addresses, in many business situations, telephone locations may be a great distance from the associated billing address. While this may be due to the use of private branch exchanges ("PBXs"), it is often done for accounts payable reasons. Likewise, telephone locations may be a great distance from the associated billing address in the case of telephone number resellers for apartments, condominiums, office buildings, and institutions. The difference between telephone location and billing address can result in confusion and delay by police, fire, emergency medical personnel and the like attempting to respond to a 911 caller's needs.

Consequently, there exists a need for a low cost emergency response system that provides extremely accurate telephone location information to an emergency response dispatcher. The present invention is directed to fulfilling this need.

SUMMARY OF THE INVENTION

In accordance with this invention, an emergency response system that includes a location identification module associated with each residence or extension of a PBX or the like, is provided. Preferably, the location identification module is a solid state circuit powered by telephone line voltage. A location identification module is enabled when an associated telephone goes off-hook and an emergency response code, e.g., 911, is dialed. Thereafter, in response to an inquiry from the emergency response center that receives the emergency response (911) call, the location identification module automatically generates information about the location of the associated telephone. The location information is sent to the emergency response center.

In accordance with other aspects of this invention, in functional block form, the location identification module includes an off-hook detector, an emergency code (e.g., 911) detector, a location response block and a location storage block. The emergency code detector is enabled to detect an emergency code when the local telephone goes off-hook. The ring detector disables the emergency code detector if a ring is detected without the telephone going off-hook and generating an emergency code. In other words, normal ring signals disable the emergency code detector. If the emergency code detector receives an emergency code after the associated telephone goes off-hook, the location response block is enabled. Upon receipt of an address request from an emergency response dispatcher, the enabled location response block reads the location of the associated telephone from the location storage block reads the location of the associated telephone from the location storage block; and the location information is transmitted to the emergency response dispatcher.

In accordance with further aspects of this invention, preferably the emergency code detector remains enabled for a predetermined period of time after an emergency code is dialed even if the calling telephone goes on-hook. This allows an emergency dispatcher to call back and, when the calling telephone goes off-hook, obtain telephone location information, which is not available to the normal caller due to the ring signal disabling the emergency code detector.

In accordance with still other aspects of this invention, in functional block form, the emergency response center includes an off-hook detector that enables a location request block when an emergency response dispatcher receives an emergency call and goes off-hook. The location request block either automatically, or manually under the control of the emergency response dispatcher, sends a location request to the calling telephone. A location verification block verifies that location information has been received. If location information is not received, the location request is repeated. Preferably, a passed cyclic redundancy check (CRC) protocol is included to verify that the data received is location information. If the passed CRC test is passed, the received location information is displayed for use by the emergency response dispatcher and, preferably, printed to create a hard copy.

In accordance with yet still further aspects of this invention, preferably the emergency code detector of the location identification module is also designed to detect a test code, which may be in the form of a conventional telephone number. As with the emergency code, the test code causes the emergency code detector to enable the location response block. In this regard, the emergency response system also includes a test response center that automatically or manually replies to the test code like the emergency response center. More specifically, functionally, the test center includes an off-hook detector that enables a location request block when the test center receives and answers a test call from a telephone. The location request block either automatically, or manually under the control of a human tester, sends a location request to the calling telephone. A location verification block verifies that location information has been received. If location information is not received, the request is repeated. Preferably, a passed CRC protocol is included to verify that the data received is location information. After receiving the location information, the test center verbalizes the location information either automatically using a voice synthesizer or manually by the human tester.

As will be readily appreciated from the foregoing summary, the invention overcomes the disadvantages of the present enhanced 911 emergency response systems. Because a location identification module is associated with each telephone location, the need for an expensive regional reverse directory is eliminated. While a location identification module is associated with each telephone, a module may not be associated with each telephone. For example, a single module will normally be located at each residence, even though the residence has multiple telephones. A small PBX may have a single module, while a large PBX serving a large area may have several modules. As a matter of fact, while the preferred form of the invention in a residence environment is a solid state hardware module, in the case of a PBX, the invention could be incorporated in the software operating the PBX. In the case of a telephone number reseller, a location identification module would be associated with the telephones at the same physical location. In the case of a solid state hardware module, preferably, the module is implemented in a low power form suitable for energization by telephone line power. This avoids the need for batteries or external power sources, which may fail. Only a failure of the telephone network will result in a failure of such embodiment of the invention.

BRIEF DESCRIPTION OF THE DRAWINGS

The forgoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As will be better understood from the following description, the invention provides an emergency response system for a telephone network that includes a location identification module associated with each residence or each extension of a PBX or the like. Preferably, the location identification module is a solid state circuit powered by telephone line voltage. A location identification module is enabled when an associated telephone goes off-hook and an emergency response code, such as 911, is dialed. Thereafter, in response to an inquiry from the emergency response center that receives the emergency response call, the location identification module automatically generates information about the location of the associated telephone. The location information is transmitted to the emergency response center via the telephone network.

The invention may also include a test response center that is functionally similar to the emergency response center. That is, the location identification module is enable when an associated telephone goes off-hook and a test response center code is dialed. Preferably, the test response center code is the telephone number of the test response center. Thereafter in response to an inquiry from the test response center, the location identification module automatically generates information about the location of the associated telephone. The location information is sent to the test response center via the telephone network. In response, the test response center generates and sends to the caller audible telephone location information. In this way, a caller can test whether the location information stored in the location identification module associated with a calling telephone is correct.

Figure 1:
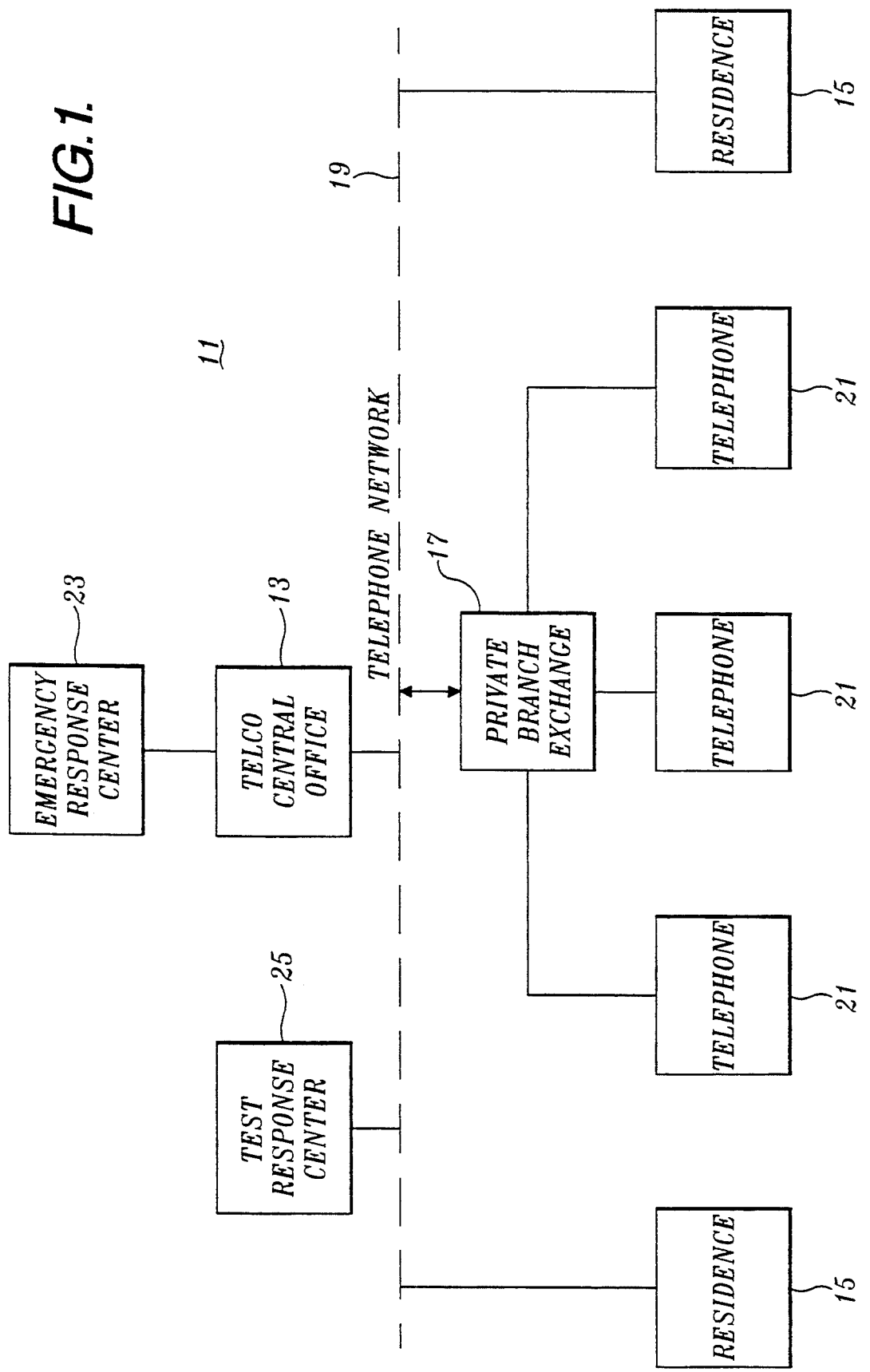
FIG. 1 is a pictorial diagram of a telephone network incorporating the present invention.

FIG. 1 illustrates a simplified telephone network 11 incorporating the present invention. More specifically, FIG. 1 illustrates a telephone network 11 that includes a telephone company ("telco") central office 13, a plurality of residences 15, and a private branch exchange (PBX) 17. The residences and the PBX are all connected to the telco central office 13 via conventional telephone cabling 19. Coupled to the PBX 17 are a plurality of telephones 21. Also connected to the telco central office 13 is an emergency response center 23 and, optionally, a test response center 25. The test response center 25 could form a portion of the emergency response center 23.

In a conventional manner, telephone communication between the residences, PBX telephone stations, the emergency response center and the test response center 25 take place via the telco central office 13. That is, when the appropriate number is dialed by one telephone, the dialing telephone is connected to the dialed (called) telephone by the telco central office. In the case of an emergency, the generation of an emergency response code (e.g., 911) by a residence telephone 15 or a PBX telephone 21 causes the telephone generating the emergency response code to be connected to the emergency response center 23 by the telco central office. If the optional test response center 25 is included, dialing the telephone number of the test response center connects the residence or PBX telephone to the test response center 25.

As noted above, associated with each residence and the PBX (or each telephone of the PBX if the PBX covers a large area) is a location identification module that stores information about the location of an associated telephone or telephones, i.e., the address of the residence, the address of the PBX or the location of a PBX telephone, which may be an apartment number, an office number, etc. In this regard, the PBX should be considered as illustrative, not limiting. The PBX could be replaced by a telephone number reseller, for example. Similarly, large residences having widely separated buildings may have several location identification modules, rather than a single location identification module. In any event, the location identification module associated with a residence or PBX telephone is enabled when an emergency response code is dialed. If the test response center is included, the location identification module is also enabled by dialing the number of the test response center.

When enabled, the location identification module is set to respond to an inquiry by either the emergency response center or the test response center for information that identifies the location of the associated telephone. In response to an inquiry, location information is sent to the emergency response center or the test response center as the case may be. Upon receipt at the emergency response center a dispatcher dispatches appropriate emergency personnel, police, fire, etc., to the residence, the location of the PBX or the location of the PBX telephone, as the case may be. If the test response center, rather than the emergency response center, is called, the test response center provides an audible response to a location information inquiry from the residence or a PBX telephone, as discussed above.

Figure 2:
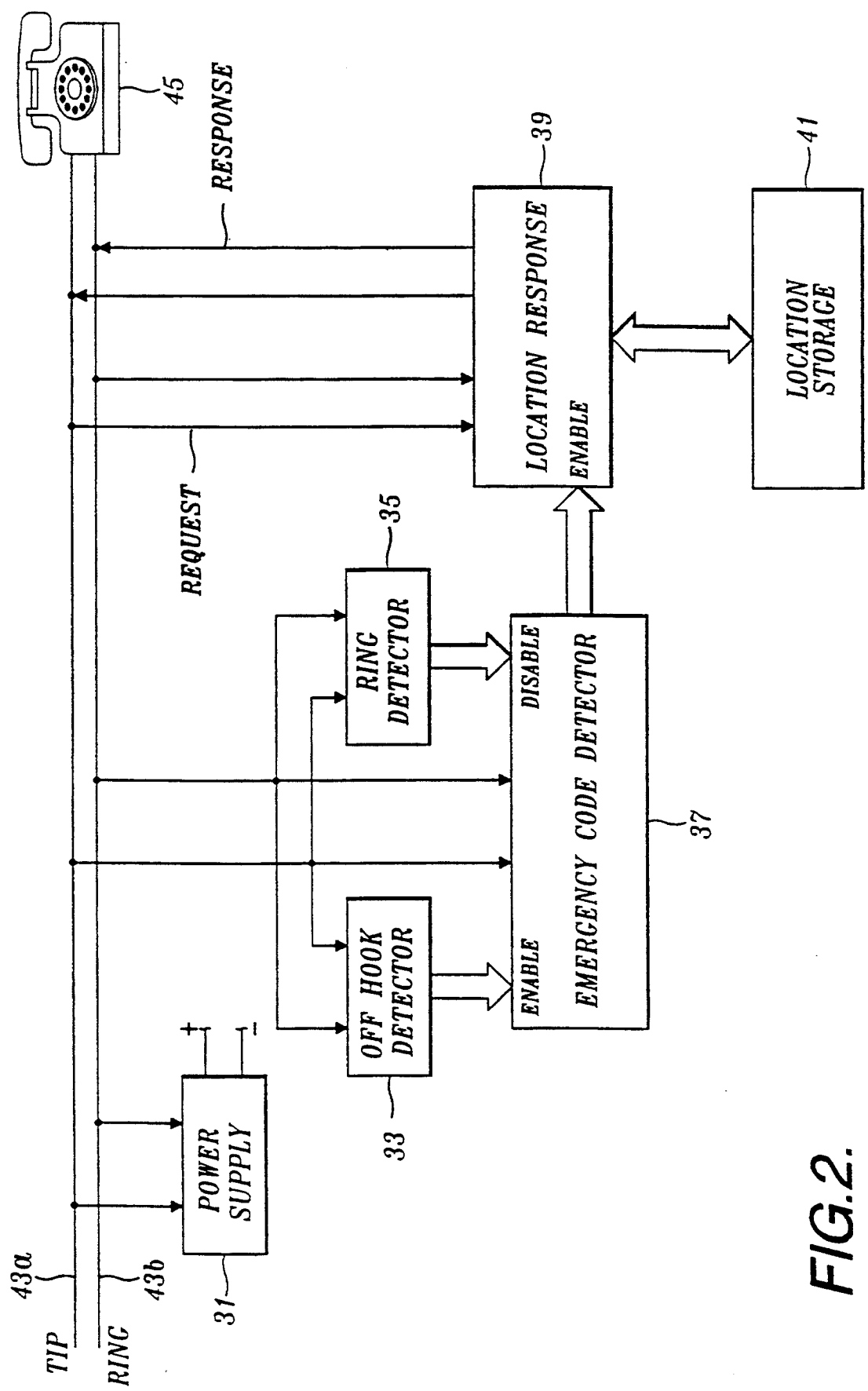
FIG. 2 is a functional block diagram of a location identification module formed in accordance with the invention.

FIG. 2 is a functional block diagram of a location identification module formed in accordance with the invention. More specifically, rather than identifying specific circuitry, blocks shown in FIG. 2 identify the major functions performed by a location identification module formed in accordance with the invention. In an actual embodiment of the invention, many of the functions may be performed in a single suitably programmed large scale integrated circuit or be taken as functionally illustrating the preferred embodiment of the invention, not limiting.

The functional block diagram illustrated in FIG. 2 includes: a power supply 31; and off-hook detector 33; a ring detector 35; and emergency code detector 37; a location response block 39; and a location storage block 41. FIG. 2 also illustrates conventional tip-and-ring telephone lines 43a and 43b connected to a conventional telephone 45, which may be rotary dial (shown) or a push button telephone, such as a dual tone, multifrequency (DTMF) telephone commonly used in the United States or a multifrequency (MF) telephone commonly used in Western Europe. Preferably, a location identification module formed in accordance with the invention is powered from the tip-and-ring lines 43a and 43b. In this regard, the power supply 31 is connected to the tip-and-ring lines 43a and 43b. The power supply 31 regulates the DC voltage carried by the tip-and-ring lines 43a and 43b and produces a regulated DC output suitable for energizing the location identification module. For ease of illustration, the power connections from the power supply to the other blocks of FIG. 2 are not shown.

The off-hook detector 33, the ring detector 35, and the emergency code detector 37 are also connected to the tip-and-ring lines 43a and 43b. The output of the off-hook detector 33 is connected to an enable input of the emergency code detector 37, and the output of the ring detector is connected to a disable input of the emergency code detector 37. As a result, when the telephone goes off-hook 45, the emergency code detector is immediately enabled. In contrast, if the ring detector 35 detects a ring signal before the telephone goes off-hook, the emergency code detector 37 is disabled. As will be better understood from the following description, the disabling operation of the ring detector 35 is delayed if the telephone 45 goes off-hook, an emergency response code is produced, and the the telephone 45 goes back on-hook. The emergency code detector is responsive to the type of telephone with which it is associated-rotary dial pulses, DTMF tones or MF tones.

The output of the emergency code detector 37 is connected to an enable input of the location response block 39. Thus, the location response block is enabled by the emergency code detector. As will be better understood from the following description of FIG. 4, enablement occurs if the off-hook detector 33 enables the emergency code detector 37 and the telephone 45 generates an emergency response code or the test response center telephone number. When enabled, the location response block is conditioned to respond to a request for location information received via the tip-and-ring lines 43a and 43b from the emergency response center 23 in the manner hereinafter described. In response to such a request, the location response block 39 reads location information from the location storage block 41 and produces a response signal that includes the location identification information. The response signal is applied to the tip-and-ring lines 43a and 43b and sent via the telephone network to the emergency response center 23 or to the test response center 25.

As noted above, preferably, the location identification module is an integrated circuit powered by telephone tip and ring line voltage. While a location identification module is associated with each telephone, as noted above, each telephone may not have a separate location identification module associated with it. A residence, for example, may include several telephones, but only one location identification module. Likewise, a small PBX may have a single location identification module for all PBX telephones, while each phone of a large PBX may have a separate location identification module. Further, while location identification modules could be built into the circuitry of a telephone, preferably, location identification modules are located at the terminal end of the telco or PBX line to which a telephone or telephones will be connected. For example, a location identification module could be located at the residence termination end of a telco line or in the case of a large PBX covering an office complex, a hotel or the like, a location identification module could be contained in each telephone wall jack. Alternatively, the location identification module could take the form of a module of the program operating the large PBX.

Figure 3:
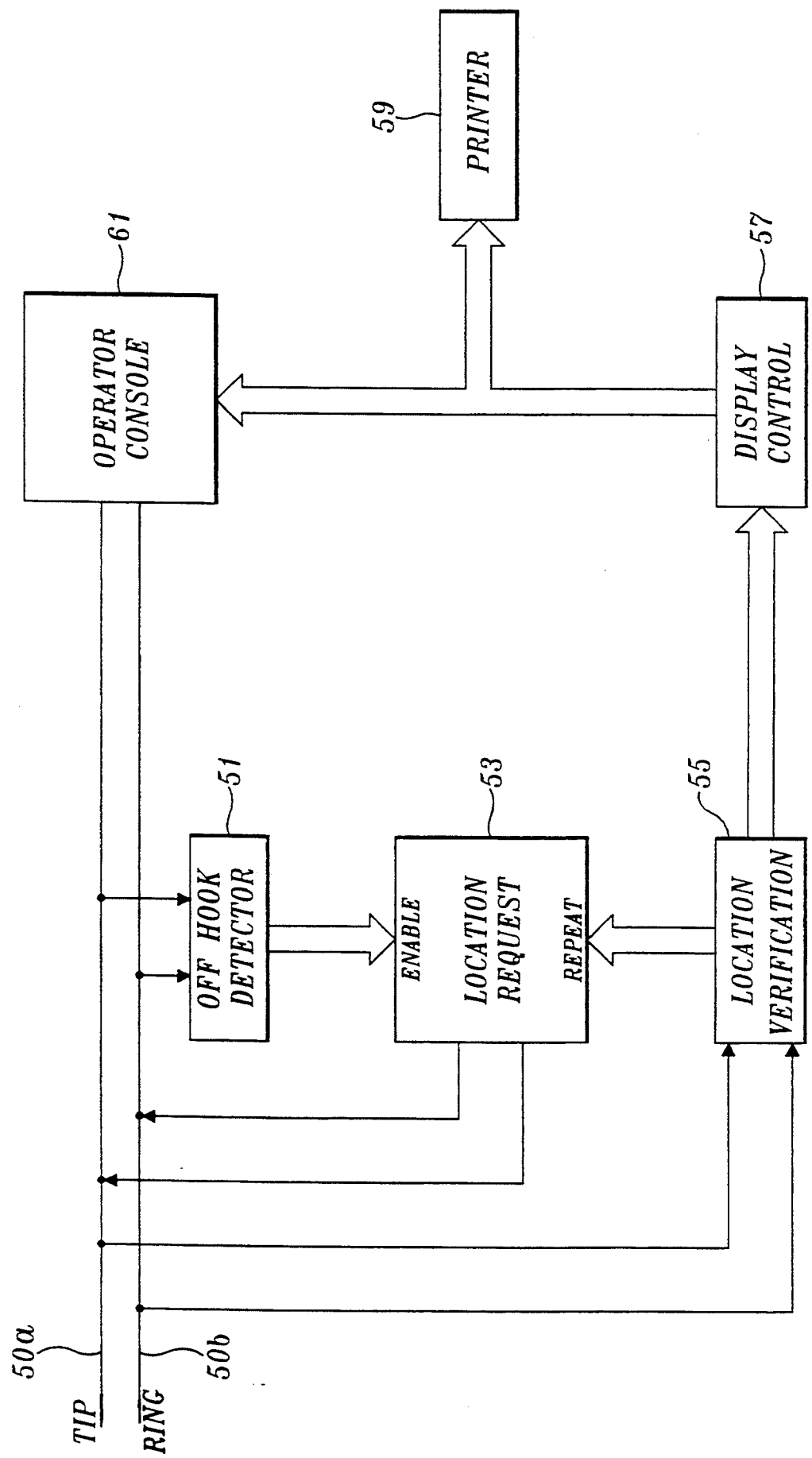
FIG. 3 is a functional block diagram of a portion of an emergency response center incorporating the present invention.

FIG. 3 is a functional block diagram of a portion of emergency response center incorporating the present invention. While illustrated in functional block form, preferably the functions performed at the emergency response center are incorporated into the software normally used to control the operator console of an emergency response center. More specifically, in most implementations, emergency response centers include a special purpose, or a suitably programmed general purpose, computer system that includes an operator console 61. The operator console 61 includes a CRT display and a keyboard that allows an emergency dispatcher to interface with the computer system, which is coupled to the tip-and-ring lines 50a and 50b of a telco cable via a modem (not shown). A printer 59 may be associated with the operator console 61 to provide a hard copy of the displayed information and instructions. Preferably, the functional blocks that form part of the invention illustrated in FIG. 3 and described next are incorporated into the software that controls the computer of such a system. Alternatively, the functional blocks could be incorporated into a stand alone hardware/software system.

The functional block diagram illustrated in FIG. 3 includes an off-hook detector 51, a location request block 53, a location verification block 55, a display control block 57, the printer 59, and the operator console 61. The telco tip-and-ring lines 50a and 50b from the telco central office are coupled to the off-hook detector 51 and the location verification block 55. The output of the off-hook detector is coupled to an enable input of the location request block 53. Thus, when the emergency dispatcher goes off-hook in response to the receipt of an emergency response code, i.e., in response to a 911 call, the location request block 53 is enabled.

When enabled, the location request block 53 automatically, or under the control of the operator (i.e., manually) sends a location request via the tip-and-ring lines to the location identification module associated with the calling telephone. The location verification block 55 receives and analyzes the location information generated by the location identification module associated with the calling telephone in the manner generally described above and described below in more detail. If a suitable location identification signal is not received, the location verification block 55 causes the location request block 53 to repeat the location request. Upon receipt of and verification of location information, the location identification block 55 causes the display control 57 to display the location information on the operator's console 61 and, preferably, the printer 59 to print a hard copy of the same information.

Figure 4:
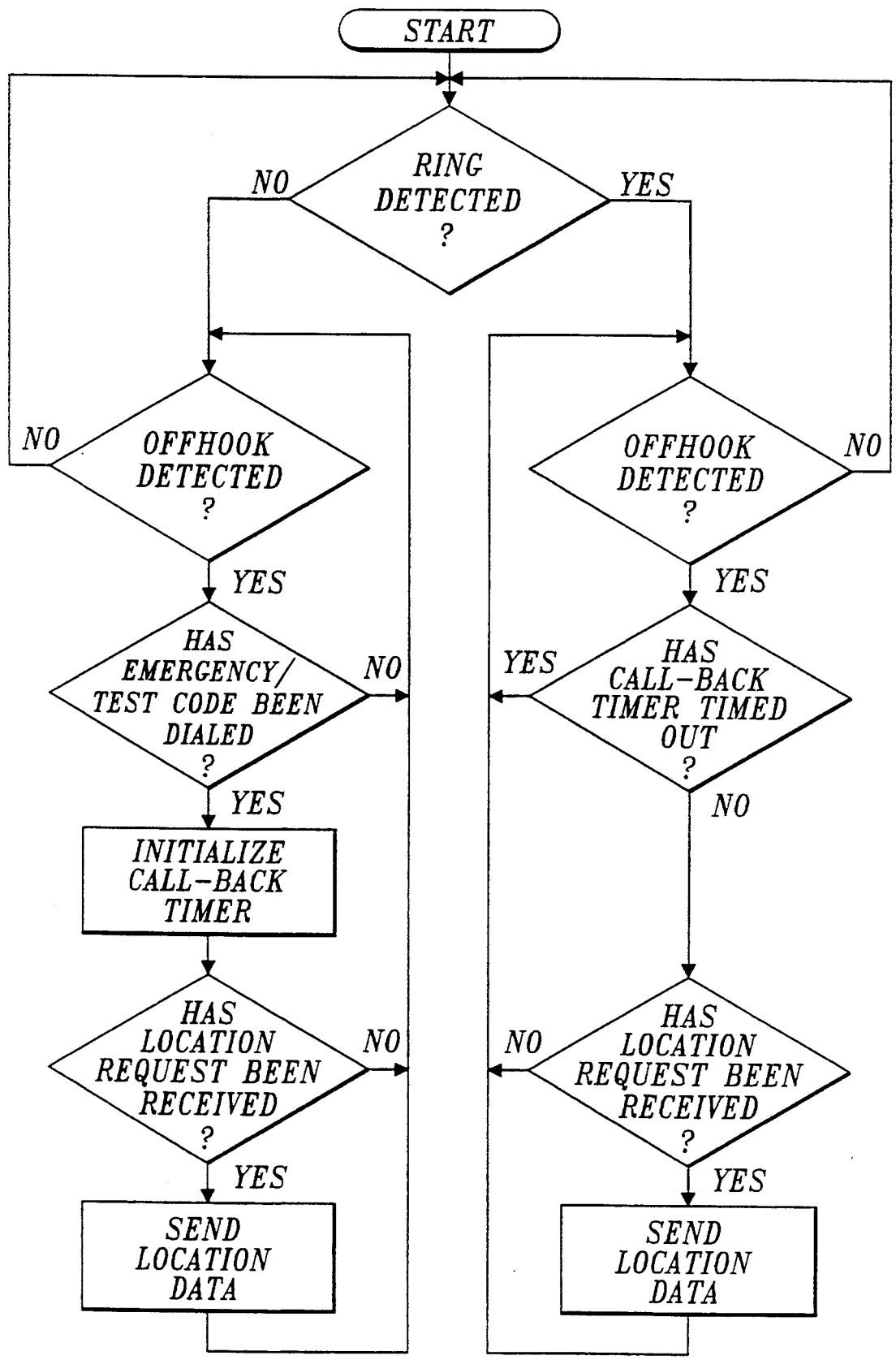
FIG. 4 is a flow diagram illustrating the operation of the location identification module illustrated in FIG. 2.

FIG. 4 is a flow diagram illustrating the operation of the location identification module illustrated in FIG. 2. The location identification module is preprogrammed with a control program designed to control the operation of the emergency code detector and the location response block in any suitable manner. For example, the location identification module could include a read-only memory (PROM) that includes instruction bits designed to control the function of these blocks of a location identification module. A programmable ROM, such as an erasable programmable read-only memory (EPROM) could be used to form the location storage block 41 that stores location information (data).

Operation of the location identification module is initiated, i.e., started, when power is supplied to the location identification module. After being started, the location identification module tests the tip-and-ring lines to determine if a ring has been detected. If a ring has not been detected, a test is made to determine if the associated telephone(s) has gone off-hook. If the associated telephone has not gone off-hook, the ring detected test is repeated. The program remains in this loop until a ring is detected or the telephone goes off-hook. If the associated telephone goes off-hook prior to a ring being detected, as shown on the left side of FIG. 4, a test is made to determine if an emergency code or a test code (e.g., test response center telephone number) has been dialed. In this regard, when an emergency code or a test code is dialed, in a conventional manner, a software "flag" is set in the emergency code detector 37. The "Has emergency test code been detected?" test tests the state of this flag. If the flag is not set, the off-hook test is repeated. If the off-hook telephone goes on-hook (normal telephone call), without an emergency code or a test code being dialed, the program cycles to the ring detected test.

If an emergency response code has been dialed, a callback timer is initialized. Thereafter, a test is made to determine if a location request has been received. If no location request has been received, the program cycles to the off-hook detected test. If the calling telephone is still off-hook, the "Has emergency/test code been dialed?" test is repeated, followed by a reinitialization of the callback timer, and a repeat of the "Has location request been received?" test. If the off-hook telephone goes on-hook while the program is in this loop, the ring detected test is repeated. If the telephone remains off-hook, and a location request is received, the location data stored in the location storage block 41 (FIG. 2) is sent to the emergency response center. Thereafter, the program cycles to the off-hook detected test, and the cycle is repeated.

As shown on the right side of FIG. 4, if a ring is detected before a telephone associated with the location identification module goes off-hook, a test is made to determine if the telephone(s) associated with the location module is off-hook. If the telephone is not off-hook, the ring detected test is repeated. If the telephone goes off-hook, a test is made to determine if the callback timer has timed out. In the case of a normal incoming call, the callback timer would not have been initialized. As a result, the callback timer would have timed out. In this case, the off-hook detected test is repeated and the program remains in this loop until the call is completed and the telephone goes on-hook. In contrast, if an emergency code or test code has been dialed, and the calling telephone been returned to an on-hook state, the callback timer would have been set. In this case, the callback timer would not have initially timed out. As a result, a test is made to determine if a location request has been received. If a location request has not been received, the program cycles back to the off-hook detected test and the cycle is repeated until the call-back timer times out or a location request is received. If a location request is received, the location data stored in the location storage block 41 is transmitted to the emergency response center. Thereafter, the program cycles to the off-hook detected test.

As will be appreciated by those familiar with emergency response systems, the portion of the flow diagram illustrated on the right side of FIG. 4 covers the situation where an emergency response call is made and the caller inadvertently or in the "heat" of the situation hangs up the calling telephone. In this case, during the period controlled by the callback timer, an emergency dispatcher can call the calling telephone and, if the calling telephone goes off-hook, obtain location identification information from the location identification module.

Figure 5:
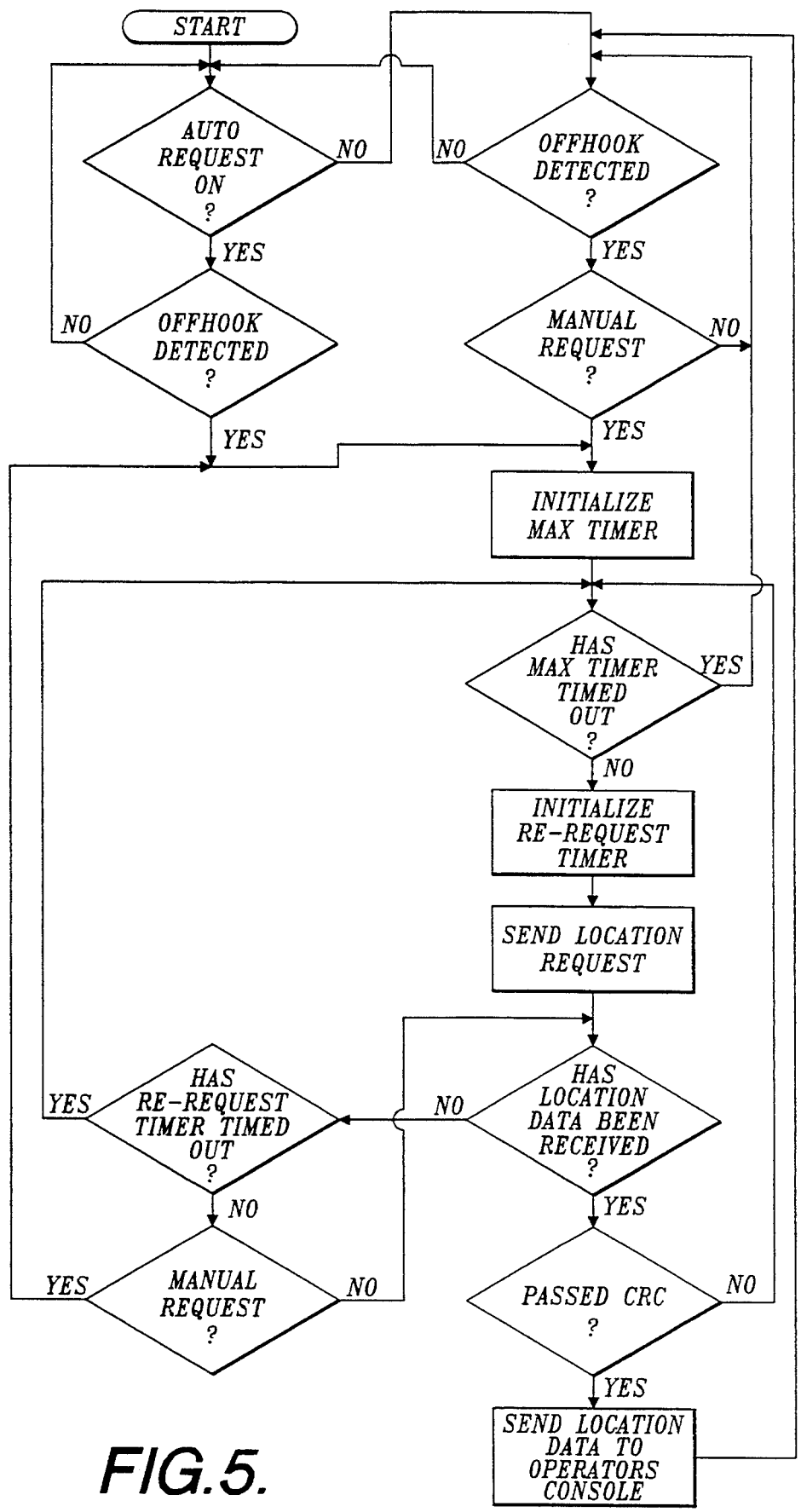
FIG. 5 is a flow diagram illustrating the operation of the portion of the emergency response center illustrated in FIG. 3.

FIG. 5 is a flow diagram illustrating the operation of the portion of the emergency response center illustrated in FIG. 3. The first step is a test to determine if an automatic request switch (or flag) has been set, i.e., a test is made to determine if auto request is on. In the case of a switch, the state of the switch is controlled by the emergency response center dispatcher. In the case of a flag, the state of the flag is controlled by the emergency response center dispatcher setting a computer flag. If auto request is on, a test is made to determine if the emergency dispatcher's telephone is off-hook. If the emergency dispatcher's telephone is not off-hook, the auto request test is repeated. If the emergency dispatcher's telephone is off-hook, a maximum (max) timer is initialized. Thereafter, the program proceeds in the manner described below.

If the auto request is not on, a test is made to determine if the emergency dispatcher's telephone is off-hook. If the emergency dispatcher's telephone is not off-hook, the auto request on test is repeated. If the emergency dispatcher's telephone is off-hook, a manual request test is made. This test tests the state of a manually actuatable switch to determine if it has been actuated by the emergency dispatcher. If the manual request test is negative, the off-hook detected test is repeated. The program remains in this loop until a manual request is made. When a manual request is made, the max timer is initialized.

After the max timer has been initialized, a test is made to determine if the max timer has timed out. If the max timer has timed out, the program cycles to the off-hook detected test occurring prior to the manual request test. If the maximum timer has not timed out, a rerequest timer is initialized. Thereafter, a location request is sent to the location identification module associated with the calling telephone. Next a test is made to determine if location data has been received. If location data has not been received, a test is made to determine if the rerequest timer has timed out. If the rerequest has not timed out, a test is made to determine if a manual request has been made. If no manual request has been made, the "Has location data been received?" test is repeated. The program remains in this loop until either the location data is received, the rerequest timer times out, or a manual request is made. If a manual request is made, the program cycles to the point where the maximum timer is initialized. If the rerequest timer times out, the program cycles to the point where the "Has max timer timed out?" test is performed.

When location data is received, it is tested to determine if it passes a passed CRC test. If the received data does not pass the passed CRC test, the program cycles to the point where the "Has max timer timed out?" test is performed. If the passed CRC test is passed, the location data is sent to the operator's console for display. See FIG. 3 and the previous description.

In essence, the emergency response center has the option of automatically requesting location identification data upon the receipt of an emergency response call. Alternatively, or after an auto request is made, the emergency response center has the capability of manually requesting location identification data. After a manual request is made, or after an auto request is made, a maximum timer is initialized. Unless a manual request is made, prior to the timing out of the maximum timer, the location request is repeated one or more times, determined by the setting of a rerequest timer. Received location identification data is verified for accuracy by a passed CRC test and, then, displayed. If a manual request is made any time during the maximum timer period or the rerequest timer period, the system reinitializes the maximum timer and repeats one or more times the request for location identification data.

Figure 6:
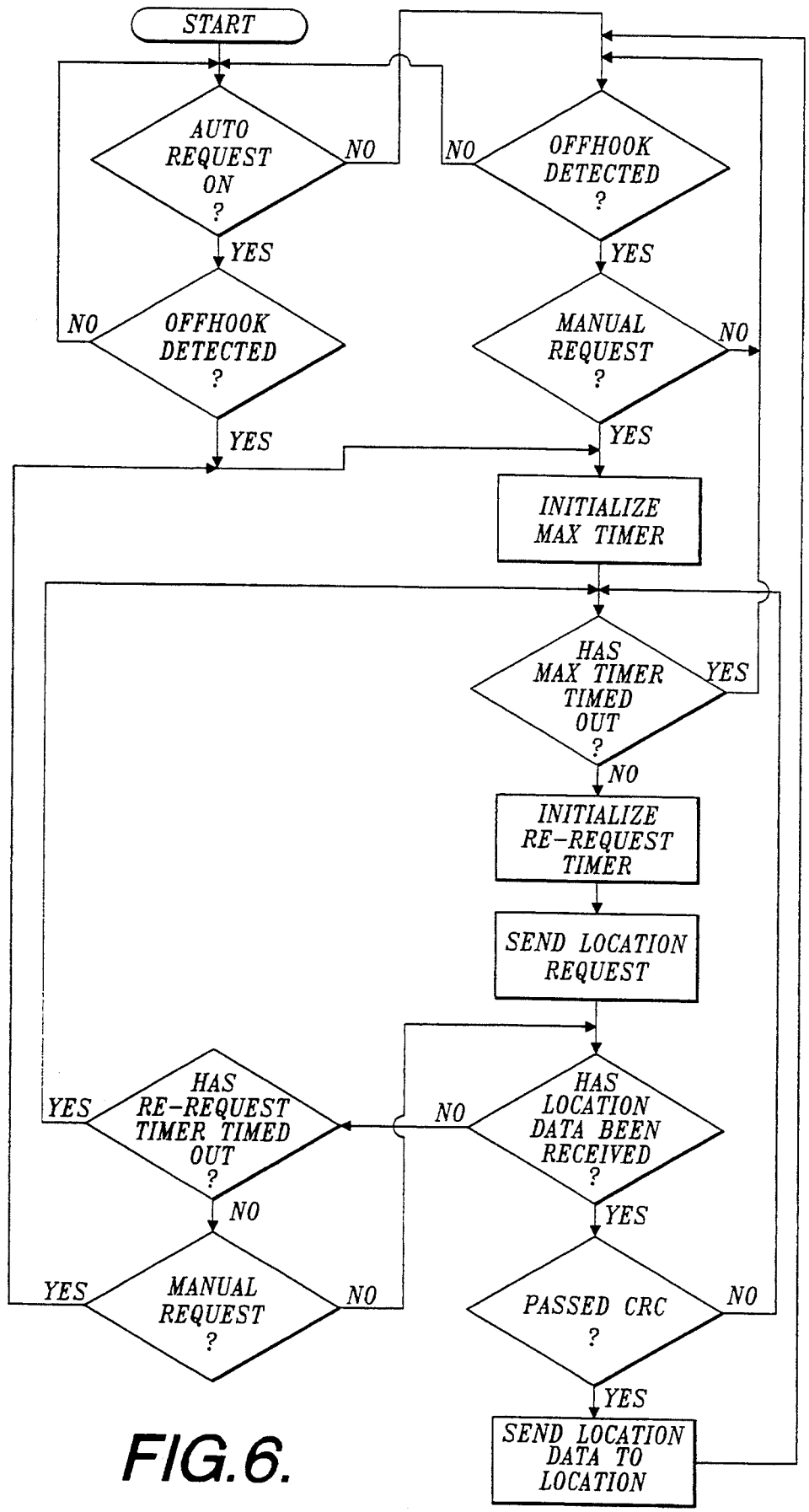
FIG. 6 is a flow diagram illustrating the operation of the test response center illustrated in FIG. 1.

FIG. 6 is a flow diagram illustrating the operation of the test response center 25, illustrated in FIG. 1. Preferably, the operation of the test response center is substantially identical to the operation of the emergency response center. That is, as will be readily apparent from comparing FIGS. 5 and 6, except for what occurs after location identification data has been received and confirmed by the passed CRC verification procedure, the operation of the test response center is identical to the operation of the emergency response center. Due to the identity of the flow diagrams up to this point, in order to avoid unnecessary duplication, the test response center flow diagram illustrated in FIG. 6 is not described in detail here.

After the test response center has verified that the passed CRC test has been satisfactorily passed, location identification data is sent in an audible manner to the telephone making the test call in the manner described above. This can be accomplished in different ways. For example, a voice synthesizer can be energized to automatically verbalize the location identification data received from the location identification module. Alternatively, the location identification information could be displayed or printed for reading by a test response operator, who audibly transmits the location identification information to the caller. The latter approach has the benefit of allowing the test response operator to provide the location identification information in the language of the calling party, which is particularly important in situations where multiple languages are common.

As will be readily appreciated from the foregoing description, the invention provides an emergency response system that includes a location identification module associated with each residence or each extension of a PBX, or the like. While location identification modules formed in accordance with this invention are preferably solid state circuits powered by telephone line voltage, location identification modules can be included in the software of a subsystem, such as a PBX, or powered by a separate power source, if desired. Regardless of whether embodied in hardware or software, a location identification module formed in accordance with this invention is enabled when its associated telephone goes off-hook and an emergency response code is dialed. Thereafter, in response to an inquiry from an emergency response center, the location identification module automatically generates information about the location of the calling telephone. The location information is sent to the emergency response center. Preferably, the invention also includes a test response center, which may be the same as the emergency response center. In any event, generation of a test response center code, which may be the telephone number of the test response center, causes the test response center to send an inquiry similar to the inquiry generated by an emergency response center. In response to the inquiry, the location identification module generates informations about the location of the associated telephone. The information is sent to the test response center. The test response center provides audible location identification information based on the location identification information generated by the location identification module.

While the preferred embodiment of the invention has been illustrated and described, it will be appreciated that various changes can be made therein without departing from the spirit and scope of the invention. For example, rather than the emergency code being a well known emergency code such as 911, the emergency code could be the telephone number of an emergency providing service, such as a police or fire station. Such a service facility would have the capability of sending a location request to the location identification module associated with the calling telephone and receiving and displaying the requested location data. Thus, within the scope of the appended claims, it is to be understood that the invention can be practiced otherwise than as specifically described herein.

The embodiments of the invention in which an exclusive property or privilege is claimed are defined as follows:

1. An emergency response system for a telephone network comprising at least one central office and a plurality of telephones coupled to said at least one central office either directly or indirectly, said emergency response system comprising:
  (a) a plurality of location identification modules, said plurality of location identification modules being associated with the telephones of said telephone network by connecting the location identification modules across the pair of tip and ring wires of the telephone lines extending to said associated telephones on a one-to-one basis such that each pair of tip and ring wires is connected to a separate location identification module, said location identification modules including:
    (1) storage means for storing information about the location identification of all associated telephones connected to the pair of tip and ring wires to which the location identification module is connected;
    (2) enabling means for enabling said location identification modules to respond to a request for location identification information when an associated telephone goes off-hook and an emergency code is dialed by the associated telephone; and
    (3) sending means for sending said location identification information stored in said storage means to an emergency response center after being enabled upon receipt of a request for said location identification information from said emergency response center; and
  (b) an emergency response center forming part of said telephone network and connected by said at least one central office to said telephones when any of said telephones dials said emergency code, said emergency response center including location request means for requesting location identification information from the location identification module associated with a telephone connected to said emergency response center.

2. An emergency response system as claimed in claim 1, wherein at least some of said location identification modules are electronic circuits powered entirely by the power carried by the pair of tip and ring wires of said telephone network to which said location identification modules are connected.

3. An emergency response system as claimed in claim 2, wherein said at least some of said location identification modules are located in close proximity to the telephones with which said location identification modules are associated.

4. An emergency response system as claimed in claim 3, wherein said enabling means includes ring detecting means for detecting the application of a ring signal to said associated telephone, said ring detecting means preventing said enabling means from responding to a request for location identification information from said emergency response center when said ring detecting means detects a ring signal unless said associated telephone has gone off-hook and said emergency code has been dialed within a predetermined period of time prior to when said ring signal occurs.

5. An emergency response system as claimed in claim 4, wherein said enabling means includes emergency code detection means for detecting the dialing of said emergency code by the associated telephone.

6. An emergency response system as claimed in claim 5, wherein said enabling means includes off-hook detection means for enabling said emergency code detection means to detect the dialing of said emergency code by the associated telephone.

7. An emergency response system as claimed in claim 6, wherein said emergency response center includes an off-hook detection means for detecting when said emergency response center goes off-hook and enabling said location request means when said emergency response center goes off-hook.

8. An emergency response system as claimed in claim 7, wherein said emergency response center includes a location verification means for verifying that the location identification information received in response to a request for location identification information is error free.

9. An emergency response system as claimed in claim 8, wherein said location verification means enables said location request means to repeat a location request signal in the event the received location identification information is not verified as error free.

10. An emergency response system as claimed in claim 9, wherein said emergency response center includes an operator console means coupled to said location request means for displaying the location identification information received from a location identification module.

11. An emergency response system as claimed in claim 7 wherein:
(a) said emergency response system also includes a test response center forming part of said telephone network and connected to the dialing telephone when any of said telephones dials the number of said test response center, said test response center including location request means for requesting location information from the location identification module associated with a telephone connected to said emergency response center;
(b) said enabling means also enables said location identification modules to respond to a request for location identification information when the associated telephone goes off-hook and the number of said test response center is dialed by the associated telephone; and
(c) said sending means also sends said location identification information stored in said storage means to said test response center after being enabled upon receipt of a request for said location identification information from said test response center.

12. An emergency response system as claimed in claim 11, wherein said test response center includes an off-hook detection means for detecting when said test response center goes off-hook and enabling said location request means of said test response center when said test response center goes off-hook.

13. An emergency response system as claimed in claim 12, wherein said test response center includes a location verification means for verifying that the location identification information received in response to a request for location identification information is error free.

14. An emergency response system as claimed in claim 13, wherein said location verification means enables said location request means of said test response center to repeat a location request signal in the event the received location identification information is not verified as error free.

15. An emergency response system as claimed in claim 1, wherein said enabling means includes ring detecting means for detecting the application of a ring signal to said associated telephone, said ring detecting means preventing said enabling means from responding to a request for location identification information from said emergency response center when said ring detecting means detects a ring signal unless said associated telephone has gone off-hook and said emergency code has been dialed within a predetermined period of time prior to when said ring signal occurs.

16. An emergency response system as claimed in claim 15, wherein said enabling means includes emergency code detection means for detecting the dialing of said emergency code by the associated telephone.

17. An emergency response system as claimed in claim 16, wherein said enabling means includes off-hook detection means for enabling said emergency code detection means to detect the dialing of said emergency code by the associated telephone.

18. An emergency response system as claimed in claim 17, wherein said emergency response center includes an off-hook detection means for detecting when said emergency response center goes off-hook and enabling said location request means when said emergency response center goes off-hook.

19. An emergency response system as claimed in claim 18, wherein said emergency response center includes a location verification means for verifying that the location identification information received in response to a request for location identification information is error free.

20. An emergency response system as claimed in claim 19, wherein said location verification means enables said location request means to repeat a location request signal in the event the received location identification information is not verified as error free.

21. An emergency response system as claimed in claim 20, wherein said emergency response center includes an operator console means coupled to said location request means for displaying the location identification information received from a location identification module.

22. An emergency response system as claimed in claim 18 wherein:
(a) said emergency response system also includes a test response center forming part of said telephone network and connected to the dialing telephone when any of said telephones dials the number of said test response center, said test response center including location request means for requesting location identification information from the location identification module associated with a telephone connected to said emergency response center;
(b) said enabling means also enables said location identification modules to respond to a request for location identification information when the associated telephone goes off-hook and the number of said test response center is dialed by the associated telephone; and
(c) said sending means also sends said location identification information stored in said storage means to said test response center after being enabled upon receipt of a request for said location identification information from said test response center.

23. An emergency response system as claimed in claim 22, wherein said test response center includes an off-hook detection means for detecting when said test response center goes off-hook and enabling said location request means of said test response center when said test response center goes off-hook.

24. An emergency response system as claimed in claim 23, wherein said test response center includes a location verification means for verifying that the location identification information received in response to a request for location identification information is error free.

25. An emergency response system as claimed in claim 24, wherein said location verification means enables said location request means of said test response center to repeat a location request signal in the event the received location identification information is not verified as error free.

26. An emergency response system as claimed in claim 1, wherein said emergency response center includes an off-hook detection means for detecting when said emergency response center goes off-hook and enabling said location request means when said emergency response center goes off-hook.

27. An emergency response system as claimed in claim 26, wherein said emergency response center includes a location verification means for verifying that the location identification information received in response to a request for location information identification is error free.

28. An emergency response system as claimed in claim 27, wherein said location verification means enables said location request means to repeat a location request signal in the event the received location identification information is not verified as error free.

29. An emergency response system as claimed in claim 28, wherein said emergency response center includes an operator console means coupled to said location request means for displaying the location identification information received from a location identification module.

30. An emergency response system as claimed in claim 26 wherein:
  (a) said emergency response system also includes a test response center forming part of said telephone network and connected to the dialing telephone when any of said telephones dials the number of said test response center, said test response center including location request means for requesting location identification information from the location identification module associated with a telephone connected to said emergency response center;
  (b) said enabling means also enables said location identification modules to respond to a request for location identification information when the associated telephone goes off-hook and the number of said test response center is dialed by the associated telephone; and
  (c) said sending means also sends said location identification information stored in said storage means to said test response center after being enabled upon receipt of a request for said location identification information from said test response center.

31. An emergency response system as claimed in claim 30, wherein said test response center includes an off-hook detection means for detecting when said test response center goes off-hook and enabling said location request means of said test response center when said test response center goes off-hook.

32. An emergency response system as claimed in claim 31, wherein said test response center includes a location verification means for verifying that the location identification information received in response to a request for location identification information is error free.

33. An emergency response system as claimed in claim 32, wherein said location verification means enables said location request means of said test response center to repeat said location request signal in the event the received location identification information is not verified as error free.

34. An emergency response system as claimed in claim 1 wherein:
  (a) said emergency response system also includes a test response center forming part of said telephone network and connected to the dialing telephone when any of said telephones dials the number of said test response center, said test response center including location request means for requesting location identification information from the location identification module associated with a telephone connected to said emergency response center,
  (b) said enabling means also enables said location identification modules to respond to a request for location identification information when the associated telephone goes off-hook and the number of said test response center is dialed by the associated telephone; and
  (c) said sending means also sends said location identification information stored in said storage means to said test response center after being enabled upon receipt of a request for said location identification information from said test response center.

35. An emergency response system as claimed in claim 34, wherein said test response center includes an off-hook detection means for detecting when said test response center goes off-hook and enabling said location request means of said test response center when said test response center goes off-hook.

36. An emergency response system as claimed in claim 35, wherein said test response center includes a location verification means for verifying that the location identification information received in response to a request for location identification information is error free.

37. An emergency response system as claimed in claim 36, wherein said location verification means enables said location request means of said test response center to repeat a location request signal in the event the received location identification information is not verified as error free.

38. In a telephone network including at least one central office, a plurality of telephones coupled to said at least one central office either directly or indirectly and an emergency response center for dispatching emergency services in response to a request for emergency services received from one of said telephones, the improvement comprising:
  (a) electronic location identification means including a plurality of modules, one of said modules associated with each of said plurality of telephones by connecting the modules across the pair of tip and ring wires of the telephone lines extending to said associated telephones on a one-to-one basis such that each pair of tip and ring wires is connected to a separate module, for:
    (1) storing in each of said modules information about the location identification of all associated telephones connected to the pair of tip and ring wires to which the module is connected; and
    (2) responding to a request for location identification information from said emergency response center received after the associated telephone goes off-hook and an emergency code is dialed by the associated telephone by retrieving said stored location identification information and sending said location identification information to said emergency response center; and
  (b) including in said emergency response center location request means for requesting location identification information from said modules.

39. The improvement claimed in claim 38, wherein at least some of said modules are electronic circuits powered entirely by the power carried by the pair of tip and ring wires of said telephone network to which said modules are connected.

40. The improvement claimed in claim 39, wherein said at least some of said modules are located in close proximity to the telephones with which said modules are associated.

41. The improvement claimed in claim 40, wherein said modules include ring detecting means for detecting the application of a ring signal to said associated telephone, said ring detecting means preventing said modules from responding to a request for location identification information from said emergency response center when said ring detecting means detects a ring signal unless said associated telephone has gone off-hook and said emergency code has been dialed within a predetermined period of time prior to when said ring signal occurs.

42. The improvement claimed in claim 41, wherein said modules include emergency code detection means for detecting the dialing of said emergency code by the associated telephone.

43. The improvement claimed in claim 42, wherein said modules include off-hook detection means for enabling said emergency code detection means to detect the dialing of said emergency code by the associated telephone.

44. The improvement claimed in claim 43, wherein said emergency response center includes an off-hook detection means for detecting when said emergency response center goes off-hook and enabling said location request means when said emergency response center goes off-hook.

45. The improvement claimed in claim 44, wherein said emergency response center includes a location verification means for verifying that the location identification identification information received in response to a request for location information is error free.

46. The improvement claimed in claim 45, wherein said location verification means enables said location request means to repeat a location request signal in the event the received location identification information is not verified as error free.

47. The improvement claimed in claim 46, wherein said emergency response center includes an operator console means coupled to said location request means for displaying the location identification information received from a location identification module.

48. The improvement claimed in claim 38, wherein said modules include ring detecting means for detecting the application of a ring signal to said associated telephone, said ring detecting means preventing said modules from responding to a request for location identification information from said emergency response center when said ring detecting means detects a ring signal unless said associated telephone has gone off-hook and said emergency code has been dialed within a predetermined period of time prior to when said ring signal occurs.

49. The improvement claimed in claim 48, wherein said modules include emergency code detection means for detecting the dialing of said emergency code by the associated telephone.

50. The improvement claimed in claim 49, wherein said modules include off-hook detection means for enabling said emergency code detection means to detect the dialing of said emergency code by the associated telephone.

51. The improvement claimed in claim 50, wherein said emergency response center includes an off-hook detection means for detecting when said emergency response center goes off-hook and enabling said location request means when said emergency response center goes off-hook.

52. The improvement claimed in claim 51, wherein said emergency response center includes a location verification means for verifying that the location identification information received in response to a request for location identification information is error free.

53. The improvement claimed in claim 52, wherein said location verification means enables said location request means to repeat a location request signal in the event the received location identification information is not verified as error free.

54. The improvement claimed in claim 53, wherein said emergency response center includes an operator console means coupled to said location request means for displaying the location identification information received from a location identification module.

55. The improvement claimed in claim 38, wherein said emergency response center includes an off-hook detection means for detecting when said emergency response center goes off-hook and enabling said location request means when said emergency response center goes off-hook.

56. The improvement claimed in claim 55, wherein said emergency response center includes a location verification means for verifying that the location identification information received in response to a request for location identification information is error free.

57. The improvement claimed in claim 56, wherein said location verification means enables said location request means to repeat a location request signal in the event the received location identification information is not verified as error free.

58. The improvement claimed in claim 57, wherein said emergency response center includes an operator console means coupled to said location request means for displaying the location identification information received from a location identification module.

59. The improvement claimed in claim 38 wherein:
(a) said improvement also includes a test response center forming part of said telephone network, said test response center including location request means for requesting location identification information from said modules; and
(b) said modules also respond to a request for location identification information when the associated telephone goes off-hook and the number of said test response center is dialed by the associated telephone by retrieving said stored location information and sending said location identification information to said test response center.

60. The improvement claimed in claim 59, wherein said test response center includes an off-hook detection means for detecting when said test response center goes off-hook and enabling said location request means of said test response center when said test response center goes off-hook.

61. The improvement claimed in claim 60, wherein said test response center including a location verification means for verifying that the location identification information received in response to a request for location identification information is error free.

62. The improvement claimed in claim 61, wherein said location verification means enables said location request means of said test response center to repeat a location request signal in the event the received location identification information is not verified as error free.

63. A location identification module for attachment to the pair of tip and ring wires connecting an associated telephone directly or indirectly to a central office on a one-to-one basis for storing information about the location identification of the associated telephone and providing said location identification information upon the receipt of a request, said location identification module being formed by an electronic circuit that is powered entirely by the power carried by the tip and ring wires of a telephone network and includes:

attachment means for attaching said location identification module across the tip and ring wires of a telephone network that directly or indirectly connect a telephone to a central office;

off-hook detection means coupled to said attachment means for detecting when the telephone connected to said telephone network wires goes off-hook; and electronic means coupled to said off-hook detection means for:

storing information about the location identification of said telephone; and responding to a location request signal provided an emergency code is after said off-hook detection means has detected that said telephone has gone off-hook by sending said stored location identification information to said central office via the wires of said telephone network.

64. A location identification module as claimed in claim 63, including ring detecting means coupled to said attachment means for detecting when a ring signal is carried by the wires of said telephone network, said ring detecting means coupled to said electronic means for preventing said electronic means from responding to the location request signal when said ring detecting means detects a ring signal unless said off-hook detection means has detected that said telephone has gone off-hook and said emergency code has been received within a predetermined period of time prior to when said ring signal occurs.

65. A location identification module as claimed in claim 64, wherein said electronic means includes an emergency code detection means for detecting said emergency code.

66. A location identification module as claimed in claim 65, wherein said off-hook detection means enables said emergency code detection means to detect said emergency code.

67. A location identification module as claimed in claim 63 wherein said electronic means also responds to a location request provided a test code is received after said off-hook detection means has detected that said telephone has gone off-hook by sending said stored location identification information to said central office via the wires of said telephone network.

68. A location identification module as claimed in claim 67, including ring detecting means coupled to said attachment means for detecting when a ring signal is carried by the wires of said telephone network, said ring detecting means coupled to said electronic means for preventing said electronic means for responding to the location request signal when said ring detecting means detects a ring signal unless said off-hook detection means has detected that said telephone has gone off-hook and said emergency code or said test code has been received within a predetermined period of time prior to when said ring signal occurs.

69. A location identification module as claimed in claim 68, wherein said electronic means includes an emergency and test code detection means for detecting said emergency and test codes.

70. A location identification module as claimed in claim 69, wherein said off-hook detection means enables said emergency and test code detection means to detect said emergency and test codes.

* * * * *

UNITED STATES PATENT AND TRADEMARK OFFICE
CERTIFICATE OF CORRECTION

Page 1 of 2

PATENT NO. : 5,339,351
DATED : August 16, 1994
INVENTOR(S) : J.D. Hoskinson et al.

It is certified that error appears in the above-indentified patent and that said Letters Patent is hereby corrected as shown below:

| COLUMN | LINE | |
|---|---|---|
| 1 | 39 | "with" should read --within-- |
| 2 | 65-67 | Delete " reads the location of the associated telephone from the location storage block" |
| 4 | 7 | "embodiment" should read --embodiments-- |
| 4 | 55 | "enable" should read --enabled-- |
| 6 | 42 | "the the" should read --the-- |
| 15 (Claim 27, | 1 Line 5) | "location information identification" should read --location identification information-- |
| 17 (Claim 45, | 28 Line 4) | Delete "identification" |
| 17 (Claim 45, | 29 Line 5) | "location information" should read --location identification information-- |
| 19 (Claim 63, | 19 Line 23) | "is after" should read --is received after-- |

UNITED STATES PATENT AND TRADEMARK OFFICE
CERTIFICATE OF CORRECTION

PATENT NO. : 5,339,351
DATED : August 16, 1994
INVENTOR(S) : J.D. Hoskinson, et. al.

It is certified that error appears in the above-indentified patent and that said Letters Patent is hereby corrected as shown below:

```
   20        21     "for" should read --from--
(Claim 68, Line 6)
```

Signed and Sealed this

Third Day of January, 1995

*Attest:*

BRUCE LEHMAN

*Attesting Officer*  *Commissioner of Patents and Trademarks*